July 1, 1969    E. KISSA ET AL    3,453,038
COMPARTMENTED ELECTROCHROMIC DEVICE
Filed June 15, 1966
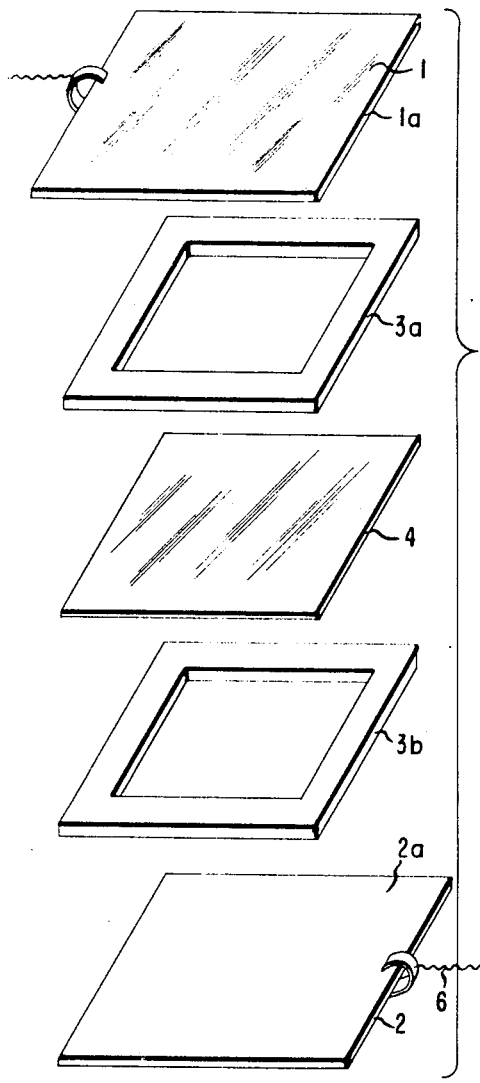
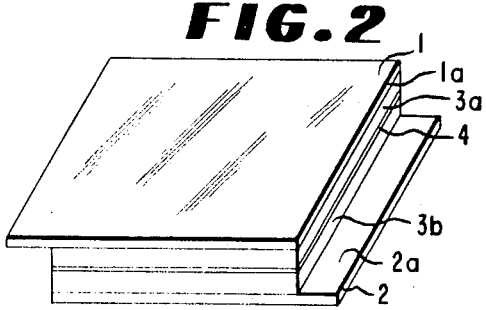
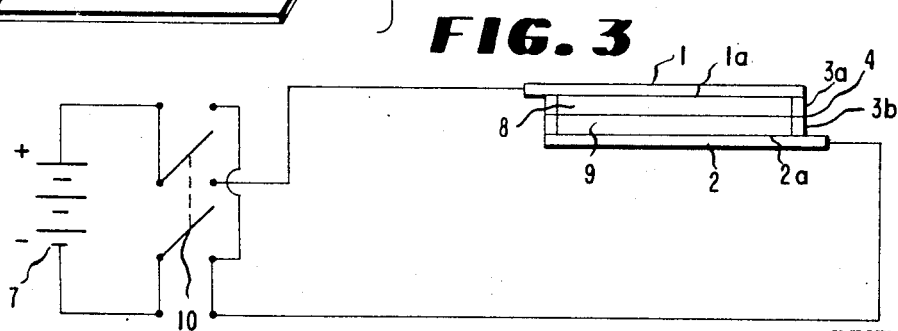
INVENTORS
ERIK KISSA
PHILIP MANOS
CHARLES F. WAHLIG
BY
ATTORNEY United States Patent Office 3,453,038
Patented July 1, 1969

3,453,038
COMPARTMENTED ELECTROCHROMIC DEVICE
Erik Kissa, Philip Manos, and Charles F. Wahlig, Wilmington, Del., assignors to E. I. du Pont de Nemours and Company, Wilmington, Del., a corporation of Delaware
Filed June 15, 1966, Ser. No. 557,671
Int. Cl. G02f 1/36
U.S. Cl. 350—160
2 Claims This invention is directed to novel electrically-operated devices utilizing transparent electrodes, color change systems which are electrically reversible, said device having means for segregating one electrode reaction from the other, in particular by use of a permselective membrane.

Various electrically-activated devices are known for signaling the presence or absence of voltage, displaying data and producing decorative effects. Almost all utilize incandescent lamps, gas glow or cathode ray tubes, electroluminescent panels, or electromechanical features. All have limited utility.

The prior art has also electrolytically produced and erased colored patterns on various solid substrates. For example, in U.S. Patent 1,068,774, there is disclosed an electrographic display apparatus and method based on electrolytically induced pH changes which cause pH indicators to change color. For color display, a mobile marking electrode is moved over a porous paper, felt or clay substrate that is impregnated with an aqueous-electrolyte pH indicator composition and backed by a second electrode. Repeating the operation with electrode polarity reversed erases the display.

With electrolytically reversible precursor-dye systems, alternating the direction of current flow alternately produces the color member at the opposite electrode. For example, briefly passing direct current through a suitable leuco dye in a suitable electrolyte causes color to appear instantly at the anode,

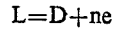

where L=the leuco base, and D=the colored form, and $n$ is the number of electrons involved in the transformation. On reversing the current flow direction through the cell, the color disappears at the first electrode (now the cathode) and reappears at the other electrode (now the anode).

Thus, to fabricate color reversal electrochromic cells that permit color erasure to be visibly observed, one must either hide the simultaneously occurring back electrode color-forming reaction from the viewer at the viewing electrode or prevent it altogether.

The prior typical prior electrochemical display devices depend for reversibility on an opaque substrate to screen the back electrode from the viewer. The disclosed formulations and methods (however satisfactory they may be for simple electrographic character production) are not entirely satisfactory for electrochromic cells designed to operate reversibly and substantially instantaneously over long periods of time. The prior devices tend to be short-lived and produce erratic results owing to irreversibly side reactions involving color-forming system, solvent or electrolyte. The disclosed opaque substrates are limited in their ability to hide the back electrode reaction from the viewer. Also the disclosed electrolyte and precursor dye systems are not repeatedly reversible under practical cell conditions. All these factors seriously affect cell durability and operability.

It is, therefore, an object of this invention to provide novel electrochromic cells utilizing transparent electrodes, an electrically reversible color change system, a second electrically reversible cell balancing system, and a cell partition to segregate the color change reaction from the cell balancing reaction. It is a further object to provide such devices which display color at a transparent electrode under applied potential and display this color indefinitely when the potential is removed. Another object is to provide such devices utilizing a transparent permselective membrane which divides the electrochromic cell into an anode compartment and a cathode compartment and which permits the passage of visible light through the transparent electrodes.

These and other objects of the invention will become apparent from the following description and claims.

More specifically, the present invention is directed to an electrochromic device comprising:

A. A cell with two facing area electrodes, at least one of which is transparent and constitutes a window of the cell;

B. A permselective membrane dividing the cell into a first compartment including the transparent electrode and a second compartment including the other electrode;

C. Means for (1) applying a potential across the electrodes and (2) reversing their polarity;

D. An electrolytically conductive first compartment matrix including electrolyte ions and at least one member of a color-generating redox system comprising the differntly colored species, $Red_1$ and $Ox_1$;

E. An electrolytically conductive second compartment matrix containing electrolyte ions and at least one member of a second redox system comprising the species $Red_2$ and $Ox_2$ such that the two compartments together contain at least one redox pair, $Red_1/Ox_2$ or $Ox_1/Red_2$; said device being further characterized in that;

F. The membrane is permeable to electrolyte ions but not to the said redox species;

G. The first electrode, when anodic, oxidizes $Red_1$ to $Ox_1$, while the second electrode reduces $Ox_2$ to $Red_2$;

H. The first electrode, when cathodic, reduces $Ox_1$ to $Red_2$; while the second electrode, now anodic, oxidizes $Red_2$ to $Ox_2$; and I. $Red_1$, the other matrix materials, and the membrane in combination constitute a first color at the transparent electrode when that electrode is cathodic, and $Ox_1$, the other matrix materials, and the membrane constitute a second color at the transparent electrode when that electrode is anodic.

A specific embodiment of this invention is one wherein both electrodes, the matrices, and the membrane are light-transparent and so-colored that the combination $Red_1$, $Ox_2$, other matrix materials, and the membrane transmit light of one color, and the combination $Ox_1$, $Red_2$, other matrix materials, and the membrane transmit light of a different color.

The basic electrochromic cell of this invention involves three essential elements: a color change redox system in a suitable electrolyte; a cell balancing redox system in a suitable electrolyte; and a permselective cell partition that divides the cell into two compartments. One compartment contains the color change redox system in contact with a viewing (transparent) electrode. Since the partition restricts the color redox system to reactions as the viewing electrode, the second compartment contains the second redox system to balance the cell electrochemically at the other electrode. The following equations summarize the cell reactions

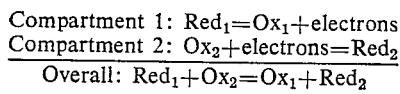

Overall: $Red_1 + Ox_2 = Ox_1 + Red_2$

Though the two redox systems react electrochemically (overall equation), the partition prevents them from physically contacting one another and therefore from reacting chemically. For current flow in such cell, the partition must permit electrolyte ions to pass from compartment to compartment. And for the cell to continue to operate, the partition must keep the two redox systems segregated in their respective compartments.

Use of a partition to restrict the color redox system to reaction at one electrode and the second redox system to reaction at the other electrode offers several advantages. It provides not only for opaque but for transparent cells useful as colored windows and light filters. Also once the desired color change reaction has been effected, this electrochromic state can be maintained indefinitely without having to continually apply potential across the cell. The color change can thus be effected at leisure because the two redox systems are maintained out of physical contact.

Cell construction and operation

The invention may be better understood by first referring to the accompanying drawings and discussing a typical cell and its operation.

FIGURE 1 shows an exploded view of the basic E–C unit wherein area electrodes 1 and 2 are separated by nonconductive gasket 3a, permselective partition 4 and nonconductive gasket 3b, which form cell chambers 8 and 9 of the assembled unit shown in FIGURES 2 and 3. Electrode 1 is, 2 may be, transparent; they are arranged with their conductive surfaces 1a and 2a facing each other. As shown in FIGURE 3, electrical leads 5 and 6 connect the electrodes to an external direct current source 7 through a double-pole, double-throw switch 10 manually or automatically operated.

In a typical cell 2″ x 2″ x ⅛″, electrically conductive transparent glass electrodes, with their $SnO_2$ conductive coatings facing each other, are spaced ⅟₃₂″ to ⅟₆₄″ apart by two nonconductive neoprene, polyethylene, "Teflon" fluorocarbon, glass, mica or other such inert solid gaskets sandwiching a permselective membrane as described more fully below. The effective electrode area of each compartment is about 2 square inches. In principle, the cells may be thinner (⅟₁₀₀″) or thicker (1″). Practically speaking the electrodes spaced by 3a, 3b, and 4 are at least ⅟₁₀₀″ apart. Preferably, for fast response, they are not more than ⅟₁₀″ or ⅟₂₅″ apart. The facing electrode area may be circular, oval, rectangular, rhomboid or any irregular shape. This area may be flat or contoured to any desired degree, convex, concave or combinations thereof. The transparent glass electrodes can be shaped by selectively removing the conductive coating from designated areas or by masking the conductive surface such that only the desired portions contact the electrochemical cell formulation.

The transparent electrode conductive coating should of course be inert to the rest of the cell constituents, for example it must not be anodically oxidized or cathodically reduced in preference to the electro responsive color change system of the matrix. Desirably the conductive coating should be highly and uniformly conductive in all directions for uniformity of response. Because $SnO_2$ coatings are normally only semi-conductive, their resistivities tend to be relatively high. Painting the perimeter with a low resistivity metallic paint, e.g. Ag, improves conductivity and minimizes the potential drop from leads 5 and 6 to the furthermost points on the electrode perimeter. Tin oxide coated transparent electrodes are available which, depending on thickness, transmit 75 to 85% of the incident light and have resistivities of about 20 to 200 square ohms.

The transparent electrodes may also be in the form of a fine mesh conductive metallic screen mounted on a nonconductive transparent background (glass or plastic); or it may consist of a thin essentially transparent conductive metallic film on such background.

The back electrode may be identical to the front transparent one or it may simply be a conventional conductive nontransparent surface. Suitable conductive and otherwise inert materials are stainless steel, platinum or other noble metal, carbon, lead dioxide. Under certain circumstances, active metal electrodes may be used, with beneficial results, as discussed later under cell balancing Redox Couple.

In the assembled cell, chamber 8, bounded by electrode 1, gasket 3a and partition 4, contains at least one member of the reversible color change redox couple, $Red_1/Ox_1$ and a supporting fluid electrolyte, as heretofore defined and described below.

Chamber 9, bounded by electrode 2, gasket 3b and partition 4, also contains a supporting electrolyte and at least one member of the reversible cell-balancing redox couple $Red_2/Ox_2$ such that the overall cell composition contains $Red_1$ in the one compartment and $Ox_2$ in the other compartment, or $Ox_1$ in the one compartment and $Red_2$ in the other compartment.

The assembled cell may be sealed with any suitable sealant such as paraffin wax, rubber cement, water glass, epoxy resin, etc. Sealed cells can also be made by applying a glass gasket and a low-melting glass frit between the glass electrodes and heat-bonding them together. Two tubes sealed into the cell allow for filling and for air to escape during filling. A conductive silver film for making electrical contact can be laid down around the edge of each electrode by applying and fusing a silver/low-melting glass frit composition. After the cell is filled, the filling and air-escape tubes are flame-sealed to hermetically seal the cell.

To operate the cell, voltage is applied from power source 7 across electrodes 1 and 2. This will usually range from 1–3 volts, sometimes, because of electrolyte resistance, 4–5 volts or higher. The applied potential is at least sufficient to overcome the various resistances and to effect the color change and cell balancing redox reactions, but not to electrolyze the background during the cell's response time, i.e. time to achieve the desired color effect. Under these conditions only $Red_1$ (leuco dye) is oxidized to $Ox_1$ (dye) at viewing electrode 1 when it is anodic and simultaneously only $Ox_2$ is reduced to $Red_2$ at the opposite electrode 2. Similarly $Ox_1$ is reduced at electrode 1 when it is cathodic while $Red_2$ is oxidized to $Ox_2$ when electrode 2 is anodic.

Reversing the electrode polarity with switch 10 reverses the reactions. At viewing electrode 1, now the cathode, $Ox_1$ (color) is reduced to $Red_1$ (leuco). The color is "erased" when the $Ox_1$ concentration falls below the visually detectable level.

The time required to change from one colored state to the other—or the response time—varies depending on the cell operating conditions, the cell ingredients and the effect desired. In general, the response time is shorter the narrower the electrode gap and the greater the electrolyte conductivity; the greater the redox species diffusion rate to and from the electrodes; and the greater the color system tinctorial strength. It is also shorter the lower the electrolyte viscosity. Fast response time is desirable in certain applications like numeric readouts. Typical cells described herein show response times as low as ¼ to 1 second. For rapid color reversal effects, i.e. flip flop operation, the electrode polarity is simply reversed by switch 8 when the desired unidirectional color effect has been attained.

Two or more cells can be joined in various combinations, in parallel or in series, and with the different viewing electrodes having identical or opposite polarity, to provide multicolored, including animated, numeric and alpha-numeric effects and displays. A particular embodiment comprises a large multiplicity of small electrochromic cells such as described above arranged as a matrix of colums and rows, constituting a billboard for displaying variable messages, sketches, graphs, photographs, etc., wherein each cell represents a point in the display.

A variety of permselective current-permeable partition materials are known and may be employed herein. Included are porous porcelain, asbestos, glass fiber paper, sheets, films and membranes of cellulosic substances such as porous cellophane and parchment, agar gel (supported on polyurethane screen or porous glass, for example), polyurethane, polyvinylidene, porous polyethylene, polyvinyl butyral, ion exchange resins, and laminates thereof. Preferred membranes as cell partitions are parchment paper, cation exchange resins wherein the fixed anionic sites are carboxylate or sulfonate groups and the cationic counterion corresponds to the cation of the electrolyte current carrier, and anionic exchange resins wherein the fixed cationic sites are quaternary ammonium groups and the counterions are the same as the anions of the electrolyte current carrier.

In general, transport of cell materials through a membrane can occur in two ways: (a) by solution of the substance in and migration through the membrane, which is essentially a physicochemical phenomena highly dependent on membrane composition; (b) by streaming through pores or holes in the membrane wall, which is essentially a mechanical process and is largely independent of the membrane's chemical make-up.

Therefore, it will be understood that such materials may differ considerably in their resistance to the flow of electrolyte materials and the various redox species depending on their chemical and physical make-up.

In view of the above, the membrane and its specifications, the electrolyte, the color redox system, and the electrochemical balancing redox system will be chosen in accordance with the above principles. For example, the ion-permeable membrane material should be a non-solvent for the redox members and if porous its pores should be small enough to prevent such components from passing through. So that the two redox systems remain segregated in their respective compartments, all the members of the two redox systems should preferably be large non-ionic molecules and if ionic should have much lower mobilities than the electrolyte current carrying ions.

The membrane may be opaque or transparent. When opaque, the second redox system may correspond to the first, since the opaque barrier will effectively hide the back electrode color-forming reaction when the color-erasing step is being effected at the front viewing electrode.

When the membrane is transparent, the overall electrochromic effect at the viewing electrode is the sum of the color states in the two membrane-separated half cells. There are two such states:

(1) The overall color of the color system's oxidized member, including its surrounding electrolyte, the membrane, and the second redox system's reduced member, including its electrolyte;

(2) The overall color of the color system's reduced member with electrolyte, the membrane, and the second redox system's oxidized member with electrolyte.

The two color sums needs only be different for operability. Each member may be colored, provided that the two sums are different. The difference between the two states is largely the difference between the individual members that actually undergo color change, that is the color system's members and the second redox system's members. It is desirable, in general, that the electrolyte, membrane, the color system's "colorless" member and both of the second redox system's members be colorless or substantially so or only lightly colored so as to provide good contrast between the two states.

The redox system

Overall this involves essentially a reductant that is reversibly oxidizable to an oxidant, $Red_1 \rightarrow Ox_1 + Me$ in one cell compartment, and an oxidant that is reversibly reducible to a reductant, $Ox_2 + ne \rightarrow Red_2$ in the other cell compartment. Neither the two reductants nor the two oxidants need be the same, but they must be contained in separate compartments. According to the present invention, one of these couples will be a redox color change couple, $Red_1/Ox_1$ where $Red_1$ and $Ox_1$ are differently colored. The second redox couple, $Red_2/Ox_2$, may or may not be a color change couple; that is, $Ox_2$ and $Red_2$ may be interconvertible without color change so that this couple is essentially a cell balancing couple.

Broadly, the redox color system and the cell balancing redox system may vary widely. They need only reversibly undergo electron transfer reactions at their respective electrodes, taking or giving up electrons to the external circuit in accordance with the needs of the redox reaction occurring at the opposite electrode. Any difference in potential needed to effect the second redox system's reactions relative to the first system's reactions can be supplied by applying an additional potential from an outside source, provided the voltage does not exceed the potential at which the background is electrolyzed.

Color change couple

Ferrous thiocyanate/ferric thiocyanate and ferrocyanide/ferricyanide couples are typical inorganic couples that can be used in the practice of this invention. Cationic dyes and their leuco precursors comprise another class that may be used; for example, tris(4-diethylamino-2-methylphenyl)methane, bis(4-diethylamino - 2 - methylphenyl)-4-benzylthiophenylmethane, bis(4-diethylamino-2 - methylphenyl)-phenylmethane, and bis(4 - dimethylaminophenyl) phenylmethane (leuco Malachite Green), which are electrolytically oxidized to the corresponding cationic colored form.

Redox color systems in which both the reduced and oxidized members are normally electrically neutral molecules are preferred for cells designed to operate reversibly and substantially instantaneously over long periods of time. Normally nonionic leuco/dye systems can be represented by

$$DH_2 = D + 2H^+ + 2e$$

where $DH_2$ is the leuco, D the oxidized (dye) form of the couple, for example an anthraquinone, indigo or thioindigo, indophenol, indoaniline, diphenoquinone, or oxo-arylidene-imidazole dye molecule.

More specifically there may be used:

(1) Anthraquinone-base leuco/dye redox systems represented by such dye forms as 1,4-bis(ispropylamino)-anthraquinone, 1,4 - dihydroxyanthraquinone, 1,8-dihydroxy - 4,5 - diaminoanthraquinone, 1-hydroxy-4-phenylaminoanthraquinone, and 1,4-bis(2-hydroxyethylamino)-5,8-dihydroxyanthraquinone.

(2) Hydroxyaryl arylamines such as N-(4-dimethylaminophenyl) - 4 - hydroxyphenylamine, N-(4-dimethylaminophenyl)-4-hydroxy-1-naphthylamine, N-(4-dimethylaminophenyl)-3-chloro-4-hydroxyphenylamine, N-(4-dimethylaminophenyl)-2-chloro - 4 - hydroxyphenylamine, N-(4 - dimethylaminophenyl)-3-bromo-4-hydroxyphenylamine, N-(4-dimethylaminophenyl)-3-ethoxy-4-hydroxyphenylamine, N-(4 - dimethylaminophenyl)-3,5-dimethyl-4-hydroxyphenylamine, N - (4-dimethylaminophenyl)-3,5-dimethoxy-4-hydroxyphenylamine, and bis(p-hydroxyphenyl)amine, which are anodically oxidized to the corresponding colored indophenols and indoanilines.

(3) Diphenoquinone colors represented by leuco $(DH_2)$/dye (D) redox couples where D=diphenoquinone, 3,5,3',5'-tetramethyldiphenoquinone, 3,5,3',5'-tetra-t-butyldiphenoquinone and 3,5,3',5'-tetramethoxydiphenoquinone.

(4) Indigo thioindigo, and the corresponding leuco structures.

(5) A new and highly preferred redox color system comprising hydroxyaryl imidazole $(DH_2)$/oxo-arylidene imidazole (D) couples

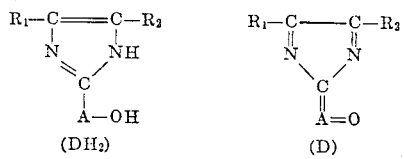

where $R_1$ and $R_2$ are aryl or substituted aryl radicals, —A— is arylene or substituted arylene and the hydroxy group is positioned such that an unshared electron pair is in conjugated relationship with the imidazole ring, said substituents when present having a Hammett sigma value in the range $-0.6$ to $-.4$. (In D, the =A= group corresponds to X-oxo(XH) arylidene, X designating a position in the arylene such that the oxo double bond is conjugated with the imidazole double bonds.)

$R_1$ and $R_2$ include polycarbocycles and polyphenyls, exemplified by naphthyl, anthryl and phenanthryl, biphenyl and terphenyl, in addition to monocyclic aryls such as furyl, thiophenyl, pyridyl and phenyl which is preferred, and such groups containing one or more substituents as defined which are electronically compatible with the oxo-arylidene-imidazole chromophore.

The substituents include electropositive (electron repelling) as well as electronegative (electron-attracting) groups. The sigma values used herein are those listed by Jaffe, Chem. Rev., 53, 191 (1953), particularly at pages 219–233, including Table 7, the largest negative or positive value being taken on the basis that is represents the maximum electron-repelling or attracting effect of the substituent. Representative substituents and their sigma values (relative to H=0.00) are: methyl ($-0.17$), ethyl ($-0.15$), t-butyl ($-0.20$), phenyl (0.22), hydroxy ($-0.36$), butoxy ($-0.32$), phenoxy ($-0.03$); dimethylamino (0.60), fluoro (0.34), chloro (0.37), bromo (0.39), iodo (0.35); methylthio ($-0.05$).

Thus, the substituents, as heretofore characterized, may be halogen, hydroxyl, alkyl, aryl, aralkyl, alkaryl, alkoxyl, aroxyl, aralkoxyl, alkaroxyl, alkylthio, arylthio, aralkylthio, alkarylthio, and dialkylamino. Preferably, alkyl and alk stand for the $C_1$-$C_5$ radicals, and aryl and ar stand for aromatic hydrocarbon radicals, e.g., phenyl. Each of these substituent groups is electronically compatible with the heretofore described chromophoric unit.

Normally A contains from 6 to 10 nuclear carbon atoms, as in phenylene and naphthylene, the oxygen group is in the 2- or 4-position, and any substituent other than hydrogen when present has a Hammett sigma value in the range $-0.4$ to $-.4$ and particularly is alkyl, halogen or alkoxyl.

A particularly preferred redox couple subclass comprises

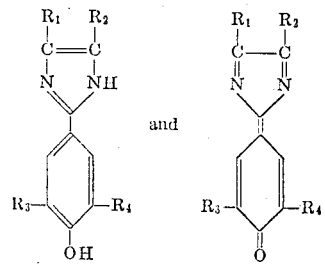

where $R_3$ and $R_4$ are hydrogen, halogen, lower alkyl or lower alkoxyl and $R_1$ and $R_2$ are phenyl or substituted phenyl, said substituents having Hammett sigma values of from $-0.6$ to 0.4. Specific examples are described by the following tabulated groups.

| AOH | $R_1$ | $R_2$ |
|---|---|---|
| 4-hydroxyphenyl | Phenyl | Phenyl. |
| Do | p-Benzylthiophenyl | Do. |
| Do | p-Dimethylaminophenyl | p-Dimethylaminophenyl. |
| Do | p-Methoxyphenyl | p-Methoxyphenyl. |
| 2-hydroxy-3,5-dibromophenyl | Phenyl | Phenyl. |
| 4-hydroxy-3,5-dibromophenyl | do | Do. |
| 4-hydroxy-3,5-dichlorophenyl | do | Do. |
| 4-hydroxy-3,5-dimethoxyphenyl | do | Do. |
| Do | p-Benzylthiophenyl | p-Benzylthiophenyl. |
| Do | p-Dimethylaminophenyl | p-Dimethylaminophenyl. |
| Do | Phenyl | Do. |
| Do | p-Methoxyphenyl | p-Methoxyphenyl. |
| 4-hydroxy-3,5-dimethylphenyl | Phenyl | Phenyl. |
| Do | p-Methoxyphenyl | p-Methoxyphenyl. |
| Do | p-Dimethylaminophenyl | p-Dimethylaminophenyl. |
| 4-hydroxy-3,5-di-t-butylphenyl | Phenyl | Phenyl. |
| Do | p-Methoxyphenyl | p-Methoxyphenyl. |
| Do | p-Dimethylaminophenyl | p-Dimethylaminophenyl. |
| Do | Phenyl | Do. |

It will be appreciated that although these systems are normally neutral, the leucos, $DH_2$, having phenolic hydrogens and sometime acidic N-H groups, may be moderately acidic salt-forming compounds. Thus, depending on the basicity of the medium, they may exist, at least to some extent, as the conjugate bases, $D^-$ and $D^{-2}$. Indeed, these anions should be more easily oxidized at the anode and may well be the first formed reduction products, $$D+2e=D^{-2}$$
$$D^{-2}+2H^+=DH_2$$

Other redox color systems that can be used include:
(1) Tetraalkyl-p-arylenediamines such as N,N,N',N'-tetramethyl - p - phenylenediamine and N,N,N',N'-tetramethylbenzidine which are respectively anodically oxidized to violet and green Würster salts.

(2) Phenazine, phenoxazine and phenothiazine color systems represented by leuco $(DH_2)$/dye (D) redox couples where D is

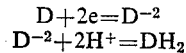

and where

| x | y | z | Common name |
|---|---|---|---|
| H | N-phenyl | O | Aposafranine. |
| H | O | O | Phenoxazone. |
| H | S | O | Phenothiazone. |
| $Et_2N$ | O | $+NEt_2, CH_3CO_2^-$ | Color Index 2nd Ed. No. 51,004. |
| $Me_2N$ | S | $+NMe_2, CH_3CO_2^-$ | Methylene blue acetete. |

Cell balancing couple

The cell balancing redox couples may involve cations or anions in the form of salts or neutral molecules that electrolyze reversibly and non-degradatively. One class comprises cations that plate out as free metal when the compartment electrode is cathodic and reoxidize to cation when the electrode is anodic. Examples are $Pb^{II}$, $Cu^I$, $Ag^I$, $Zn^{II}$, $Cd^{II}$, $Sn^{II}$ and $Tl^I$. These cations together with their free metal reduction products constitute cell balancing redox couples $Red_2/Ox_2$, i.e. $M/M+n$, where M is the metal and $n$ is its valence.

The metal, M, deposited in the reduction step constitutes a new electrode. One embodiment contemplates the use of such electrode, which, besides serving to collect current, takes part in the redox reactions. For example, when the color erasing reaction involves dye to leuco reduction D (colored $Ox_1$) $+2H^+ +2e \rightarrow DH_2$ (colorless $Red_1$)

and the oxidation of $DH_2$ occurs at a more anodic potential than the oxidation of zinc, a zinc back electrode can itself supply the electrons for the color erasing reaction, $$Zn \rightarrow Zn^{+2} + 2e$$

So long as electrode M has a higher reduction potential than $DH_2$ the cell will be self-erasing. Simply galvanically coupling electrode M to the transparent viewing electrode through a low impedance path imposes a back potential on that electrode sufficient to reduce dye to colorless leuco.

Cell balancing redox couples whose both forms remain soluble in electrochromic composition are particularly preferred for use in transparent cells. Included are cationic redox couples, represented by $M^{+p}/M^{+q}$ where M is a heavy metal, $p$ is an integer, usually from 1 to 2, and $q$ is a higher integer, usually from 2 to 4, such as $Fe^{II}/Fe^{III}$ and the $Sn^{II}/Sn^{IV}$, and anionic redox couples, such as ferrocyanide/ferricyanide. The counterions will of course be electrochemically inert, as discussed below under fluid electrolyte.

Quinone ($OX_2$)/hydroquinone ($Red_2$) couples are especially suited for cell balancing $$Q + 2H + 2e + = H_2Q$$

where Q for example stands for p-benzoquinone, 2,5-dimethyl benzoquinone, 2,5-di-t-butyl-p-benzoquinone, 1,4-naphththoquinone, duoquinone, and anthraquinone.

Fluid electrolyte

This normally consists essentially of an inert current carrier in a suitable inert solvent, both chosen to provide solutions with conductivities of at least .001 ohm$^{-1}$ cm.$^{-1}$, preferably at least .01 ohm$^{-1}$ cm.$^{-1}$, and as high as practical since the greater the conductivity the lower the internal resistance, the heat buildup, and the energy required to operate the cell. The maximum obtainable conductivity depends on the particular current carrier, the solvent and its dielectric constant and viscosity, and the other components of the electrolyte composition and their character. Since the actual quantities needed for a particuar conductivity will vary with the particular salt, the solvent, and their relative concentrations, it is impossible to specify absolute ranges for all possible electrolyte compositions within the scope of this invention. Those skilled in the art, however, already know how to determine the proportions required for such electrolyte materials. Such practice is disclosed by (1) S. Swann, Jr., in the chapter beginning on page 385 of "Technique of Organic Chemistry," A. Weissberger, editor, vol. II, 2nd Ed. (1956), Interscience, N.Y., N.Y.

(2) Harned and Owen, "The Physical Chemistry of Electrolytic Solutions," 3rd Ed., Reinhold, N.Y. (1950).

(3) Fuoss and Accescina, "Electrolyte Conductance," Interscience, N.Y. (1959).

(4) Tables Annuelles de Constantes et Donniēs Numeriques 18, "Conductivity of Electrolytes," Hermann, Paris (1937).

(5) Audrieth and Kleinberg, "Non-Aqueous Solvents (Applications as Media for Chemical Reactions)," John Wiley and Sons, N.Y. (1953).

The current carrier is normally added as an ion-forming salt. Sometimes a self-dissociating solvent such as acetic acid serves both as current carrier and solvent for the other cell components. Whatever its structure or chemical composition, the current carrier must be substantially inert: It must not react adversely with any cell ingredient, nor chemically oxidize or reduce the color redox system, nor electrolyze in preference to the color redox system. More specifically the cationic component must have a more cathodic reduction potential (be more difficultly reduced) than the oxidized form of the color-redox system and a more anodic oxidation potential (be more difficult to oxidize) than the reduced form of the color system. At the same time the anionic counterion must have a more anodic oxidation potential than the reduced form and a more cathodic reduction potential than the oxidized form.

The current carrier is preferably a neutral or only moderately basic or acidic salt, i.e. exerts a pH when measured in water of between about 4 and 9. Strong hydrogen acids and strongly alkaline reacting current carriers are less suitable as they tend to attach the tin oxide semiconductive transparent electrode coatings and react with other cell constituents. Suitable materials include mono-, di-, tri- and tetravalent metal and onium salts of inorganic and organic acids. Thus the cationic moiety may be: (a) an alkali, alkaline earth, and aluminum family metal of groups I–A, II–A and III–A of the Periodic Table described in Fundamental Chemistry, 2nd Edition, by H. G. Deming, John Wiley and Sons, Inc.; (b) a mono- or polyvalent metal of other groups of the Periodic Table, such as monovalent thallium of group III–B, divalent lead or tetravalent tin of group IVA; (c) trivalent lanthanum or other rare earth metal; (d) a IB or IIB metal such as copper, silver, zinc; cadmium or mercury; (e) tetraalkyl ammonium wherein each alkyl usually has 1 to 5 carbons, such as tetramethyl ammonium, tetraethyl ammonium, tetrabutyl ammonium, trimethylethyl ammonium, trimethylisoamyl ammonium and dimethyldiethyl ammonium.

The anionic component is normally such that the pKa of its conjugate hydrogen acid is 5 or less. It may be inorganic or organic and is generally chosen for its inertness and solubilizing effect on the salt as a whole. Particularly preferred are oxyanions wherein the central element is in its highest oxidation state such as sulfates, sulfonates, perchlorates and carboxylates. Halides, cyanides, cyanates and other comparable anions can also be used to advantage in association with said described cations.

Electrolyte solvent component

The solvent can vary widely provided it (1) dissolves sufficient quantities of (a) the current carrier to provide conductivity and (b) the redox color system to provide the desired color changes during cell operation, (2) is inert towards the other cell ingredients, and (3) is electrochemically stable during cell operation.

Preferably the solvent should also have a high dielectric constant so as to provide highly conductive solutions, low viscosity for good ionic mobility over the entire range of cell operation, and low volatility to minimize solvent loss from the cell, and should remain liquid over a wide temperature range.

The solvent is preferably non-aqueous. Included are organic hydroxylic solvents, such as methanol, ethanol, and other lower alkanols, acetic and other alkanoic acids, and nonhydroxylic organic solvents in general. Suitable nonhydroxylic organic solvents are the organic amides, preferably of secondary amines, including carboxamides, sulfonamides, phosphoramides, ureas and cyanamides; nitriles; sulfoxides; sulfones; ethers; thiocyanates; carboxylic esters; nitro compounds; and ketones. Specifically, there may be used acetonitrile, propionitrile and higher homologs; N,N-dimethylformamide, N,N-dimethylacetamide, N-methylcaprolactam, N-methylpyrrolidone, N,N-diethylformamide; hexamethylphosphoramide, hexaethylphosphoramide; N,N-dimethylethanesulfonamides; tetramethylurea; dimethyl sulfoxides and other lower alkyl sulfoxides such as diethyl sulfoxide; acetone, methyl ethyl ketone and diethyl ketone; diethylene glycol dimethyl ether and diethylene glycol methyl ethyl ether; ethyl thiocyanate, propyl thiocyanate, propylene carbonate; pyridine, picoline; N,N-dialkylamino nitriles such as N,N-dimethylcyanamide and homologs; nitromethane and nitrobenzene. Mixtures of any two or more of such solvents may be used as the electrolyte solvent. Water may be present in small proportions in the electrolyte but is generally avoided because it is easily electrolyzed, consequently tends to interfere with the color change reaction.

Carboxamides such as dimethylformamide and dimethylacetamide are particularly preferred.

From the above it will be appreciated that all the cell components are interdependently related; that the choice of current carrier for example depends on the solvent, the color redox system, and the other components. For determining component suitability and compatibility, standard redox potentials are a useful guide; still redox potentials can vary markedly with changes in environment so that it may sometimes be necessary to test components under actual cell conditions.

For reversible long-lived cells, the redox systems, the supporting chemical background (comprising the fluid electrolyte and other cell constituents that may be present) must be chosen such that the color change electrochemical transformation proceeds reversibly and to the substantial exclusion of background degradative reactions that produce impurities which eventually poison the cell, reducing its effectiveness or preventing its operation altogether. The minimum potential that must be applied to cause current flow is the algebraic sum $$E \text{ applied} = Ea - Ec + \Sigma iR$$

where $Ea$ is the oxidation potential of the species to be oxidized, $Ec$ the reduction potential of the species to be reduced, and $\Sigma iR$ the sum of the various resistances in the cell and circuitry, including the $iR$ drop through the cell composition and across the cell membrane. Redox potentials, $Ea$ and $Ec$, are conveniently determined using probe electrodes versus a standard electrode, e.g. saturated calomel electrode, according to known techniques.

Background material, such as the electrolyte, solvent, and opacifier when used, should be inert to the color and cell balancing systems and no background member should oxidize more readily than the reduced forms of the redox systems or reduce more readily than the oxidized forms of the redox systems. Relative to the potentials for effecting the color change reaction, the potentials at which the background essentially ceases to be a resistor and becomes a conductor i.e. gives or takes up electrons at a substantial rate within the cell's response time should be as high as possible. More specifically, the potentials that must be applied to the cell to bring about the background's oxidation or reduction should be at least 1.25 times the potentials needed to effect the color change reaction. Stated another way, the applied potentials for effecting the color change should not be greater than 0.8 the potentials required to electrolyze the background. Preferably the redox potentials of the color change couple and the cell balancing couple will lie midway between potentials at which the background begins to oxidize and reduce.

Electrolyte composition proportions

As discussed above the overall electrolyte compositions of this invention comprise essentially a redox color component, a cell balancing component, and an electrolytically-conductive fluid electrolyte for each compartment. More specifically, the compositions normally contain, per liter of electrolyte solvent: about .01–1 mole redox color component as described above, .01–1 mole cell balancing component as described above, more usually .02–.5 mole each, with the reductant/oxidant ratios ranging from 2/1 to 1/2, more usually about 1/1; .01–1 mole current carrying salt, more usually at least .05 mole. Opacifiers, such as zinc oxide, and thickeners, such as "Orlon" acrylic fiber, "Butacite" polyvinyl butyral resin, and "Cab-O-Sil" colloidal silica, are sometimes used, as illustrated in the following representative examples, in amounts of from .025–5 kg./liter electrolyte solvent.

In the representative examples below illustrating the present invention, the conductive glass electrodes utilized were characterized by a 50 ohm per square resistivity and 80 percent transparency. The voltages given are applied, obtained with 1.5 volt dry cell batteries or a variable voltage power supply, and are not necessarily the optimum or the minimum needed to operate each cell. The actual redox potential for each cell is, of course, lower than the operating potential and can be determined with probe electrodes relative to a reference electrode. Other details are described below.

EXAMPLE I

A first piece of filter paper was dipped into a solution of 1.2 grams (.005 mole) of N,N,N',N'-tetramethyl benzidine and 2 grams (.005 mole) of a stannic chloride-dimethyl formamide (DMF) complex, $SnCl_4 \cdot 2DMF$, in 50 ml. DMF. A second piece of the filter paper was dipped into a solution of 2 grams $SnCl_4 \cdot 2DMF$ in 50 ml. DMF. A sheet of nontransparent anion exchange membrane was placed between the two wet papers and the whole was sandwiched between transparent conductive glass electrodes. The electrodes were wired to a voltage source so that the electrode in contact with the first paper was the anode, the other electrode the cathode. Applying 3–4.5 volts across the electrodes caused a green color to appear at the anode, while the cathode side of the cell remained colorless. Upon removing the potential the anode compartment remained colored, the cathode compartment colorless. Reversing the cell polarity caused the color to disappear from the first compartment (originally anodic, now cathodic). The second compartment (originally cathodic, now anodic) remained colorless. The cell could be operated reversibly in this manner for more than several hundred reversals.

The electrode and overall reactions are summarized below:

Anode:

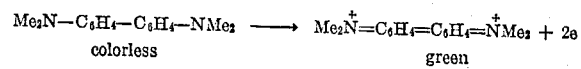
colorless            green

Cathode:

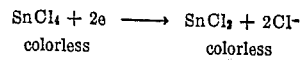
colorless      colorless

Overall:

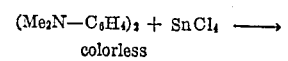
colorless

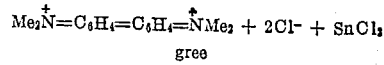
gree

EXAMPLE II

A cell as described in FIGURE 1 and having 2" x 2" x 1/8" transparent conductive electrodes spaced apart by two 1/64 inch non-conductive gaskets and separated into two compartments by a transparent sheet of cation exchange membrane was loaded as follows: The anode compartment was filled from a stock solution of 1.7 grams (.004 mole) 2-(4-hydroxy-3,5-dimethoxyphenyl) 4,5-bis(4-methoxyphenyl) imidazole and 2 grams (.005 mole) $ZnCl_2 \cdot 2DMF$ complex in 40 ml. DMF. The cathode compartment was filled from a stock solution of 1.08 gram p-benzoquinone and 2 grams $ZnCl_2 \cdot 2DMF$ in 50 ml. DMF. This cell performed reversibly for several hundred reversals under 3–4.5 volts applied potential, the anode compartment showing colorless to red transitions while the cathode compartment remained substantially colorless, in accordance with the following reactions:

Anode:

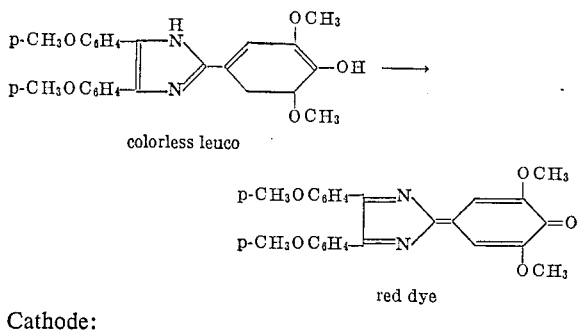

colorless leuco red dye

Cathode:

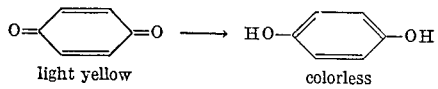

light yellow    colorless

Overall:

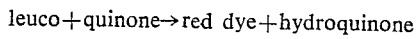

leuco + quinone → red dye + hydroquinone

The red display, created when the compartment containing the imidazole color-forming system was anodic, could be seen at the transparent cathode through the transparent membrane as well as at the transparent anode. The cell was transparent and substantially colorless when the compartment containing the imidazole system was cathodic.

EXAMPLE III

An electrochromic imidazole-containing solution as described in Example II and containing additionally six grams polyacrylonitrile powder dissolved therein per 50 ml. DMF was cast as a 30 mil film. A cell-balancing composition composed of 1.2 grams 2,5-dimethylbenzoquinone, 2 grams $ZnCl_2 \cdot 2DMF$ and 6 grams polyacrylonitrile per 50 ml. DMF was also cast as a 30 mil film. The two films were momentarily dipped in DMF and immediately sandwiched around a transparent cationic sheet membrane. This unit in turn was sandwiched between transparent conductive glass electrodes.

The cell operated reversibly as a transparent electrochromic window for thousands of reversals, showing red when the compartment containing the imidazole was anodic and colorless when it was cathode.

Similarly a colorless/green transparent electrochromic window was obtained on employing N,N,N',N'-tetramethylbenzidine (as in Example I) in place of the Example II imidazole in the above cell.

It should be noted that in Examples II and III the quinone is preferentially reduced (to the transparent hydroquinone) in the cell-balancing composition. Also the dye is preferentially reduced in the color-forming composition. The zinc chloride, which is potentially reducible (to opaque zinc metal), functions essentially as electrolyte in both compartments.

Transparent cells as described in the above example can be used to regulate glare and control admission of sprectrally-filtered sunlight into workrooms, greenhouses, hot beds and the like.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. An electrochromic device comprising:
  (A) a cell with two facing area electrodes, at least one of which is transparent and constitutes a window of the cell;
  (B) a permselective membrane dividing the cell of said (A) into a first compartment including the transparent electrode and a second compartment including the other electrode;
  (C) means for (1) applying a potential across said electrodes and (2) reversing their polarity;
  (D) an electrolytically conductive first compartment matrix including electrolyte ions and at least one member of a color-generating redox system comprising the differently colored species, $Red_1$ and $Ox_1$;
  (E) an electrolytically conductive second compartment matrix containing electrolyte ions and at least one member of a second redox system comprising the species $Red_2$ and $Ox_2$; such that the two compartments taken together contain at least one redox pair, $Red_1/Ox_2$ or $Ox_1/Red_2$; said device being further characterized in that:
  (F) said membrane is permeable to electrolyte ions but not to the said redox species;
  (G) the first electrode, when anodic, oxidizes $Red_1$ to $Ox_1$, while the second electrode reduces $Ox_2$ to $Red_2$;
  (H) the first electrode, when cathodic, reduces $Ox_1$ to $Red_1$; while the second electrode, now anodic, oxidizes $Red_2$ to $Ox_2$; and
  (I) $Red_1$, the other matrix materials, and the membrane in combination constitute a first color at the transparent electrode when that electrode is cathodic, and $Ox_1$, the other matrix materials, and the membrane constitute a second color at the transparent electrode when that electrode is anodic.

2. An electrochromic device according to claim 1 wherein both electrodes, the matrices, and the membrane are light-transparent and so-colored that the combination of said $Red_1$, $Ox_2$, other matrix materials, and the membrane transmits light of one color, and the combination of said $Ox_1$, $Red_2$, other matrix materials, and the membrane transmits light of a different color.

References Cited

UNITED STATES PATENTS 2,632,045  3/1953  Sziklai _____ 178—5.4

RONALD D. WILBERT, Primary Examiner.

P. K. GODWIN, Assistant Examiner.

U.S. Cl. X.R.

252—622